(12) United States Patent
Szczepanski et al.

(10) Patent No.: US 10,494,970 B2
(45) Date of Patent: Dec. 3, 2019

(54) EMISSIONS CONTROL SUBSTRATE

(71) Applicants: DENSO International America, Inc., Southfield, MI (US); DENSO CORPORATION, Kariya-shi, Aichi-ken (JP)

(72) Inventors: Edward Szczepanski, Grosse Point Woods, MI (US); Hironori Niwa, Kariya (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 10 days.

(21) Appl. No.: 15/641,834

(22) Filed: Jul. 5, 2017

(65) Prior Publication Data
US 2019/0010842 A1    Jan. 10, 2019

(51) Int. Cl.
| | |
|---|---|
| *F01N 3/022* | (2006.01) |
| *F01N 3/28* | (2006.01) |
| *C04B 35/195* | (2006.01) |
| *C04B 38/00* | (2006.01) |
| *C04B 111/00* | (2006.01) |

(52) U.S. Cl.
CPC ............ *F01N 3/022* (2013.01); *C04B 35/195* (2013.01); *C04B 38/0006* (2013.01);
(Continued)

(58) Field of Classification Search
CPC ............ B01D 46/0001; B01D 46/2429; B01D 46/247; B01D 46/2474; B01D 53/9445; B01D 2255/102; B01D 2255/202; B01D 2255/9205; B01D 2258/012; B01D 2258/014; B01D 2279/30; B01D 46/2451;
(Continued)

(56) References Cited

U.S. PATENT DOCUMENTS 5,709,722 A * 1/1998 Nagai ................ B01D 46/0063
55/499
8,361,592 B2 1/2013 Miyairi et al.
(Continued)

FOREIGN PATENT DOCUMENTS

| JP | H1182005 A | 3/1999 |
|---|---|---|
| JP | 2004-019498 A | 1/2004 |

(Continued)

OTHER PUBLICATIONS

Machine translation of JP-2011038410-A (Year: 2011).*

*Primary Examiner* — Brandon D Lee
(74) *Attorney, Agent, or Firm* — Harness, Dickey & Pierce, P.L.C.

(57) ABSTRACT

An emissions control substrate. The emissions control substrate includes a first end in receipt of exhaust from an engine, and a second end from which exhaust exits the substrate. The second end is opposite to the first end. A plurality of channels are defined by sidewalls. The channels are arranged between the first end and the second end to direct exhaust from the engine through the emissions control substrate. The sidewalls at least one of filter and treat exhaust particulates as the exhaust passes through the sidewalls. The plurality of channels include at least one first channel defined by sidewalls that curve inward along lengths thereof from the first end to the second end.

18 Claims, 4 Drawing Sheets

(52) U.S. Cl.
CPC .. *F01N 3/2825* (2013.01); *C04B 2111/00793* (2013.01); *F01N 2330/06* (2013.01); *F01N 2330/36* (2013.01); *F01N 2330/60* (2013.01)

(58) Field of Classification Search
CPC . B01J 35/04; B01J 23/63; Y02T 10/22; Y10T 428/24149; C04B 35/195; C04B 38/0006; C04B 2111/00793; F01N 3/022; F01N 3/2825; F01N 2330/06; F01N 2330/36; F01N 2330/60
See application file for complete search history.

(56) References Cited

U.S. PATENT DOCUMENTS

| | | | |
|---|---|---|---|
| 2004/0018123 A1 | 1/2004 | Okawara et al. | |
| 2004/0131772 A1* | 7/2004 | Yamada | B01D 46/2418 427/230 |
| 2006/0120937 A1* | 6/2006 | Zuberi | B01D 39/2082 423/215.5 |
| 2006/0144900 A1 | 7/2006 | Hirth et al. | |
| 2009/0016923 A1 | 1/2009 | Treutler et al. | |
| 2012/0102902 A1* | 5/2012 | Gallagher | B01D 46/0021 55/484 |

FOREIGN PATENT DOCUMENTS

| | | | |
|---|---|---|---|
| JP | 2007-501696 A | | 2/2007 |
| JP | 2007-262985 A | | 10/2007 |
| JP | 2008-506523 A | | 3/2008 |
| JP | 2008-168279 A | | 7/2008 |
| JP | 2010247145 A | | 11/2010 |
| JP | 2011-038410 A | | 2/2011 |
| JP | 2011038410 A | * | 2/2011 |
| WO | WO-2012058060 A2 | | 5/2012 |

* cited by examiner

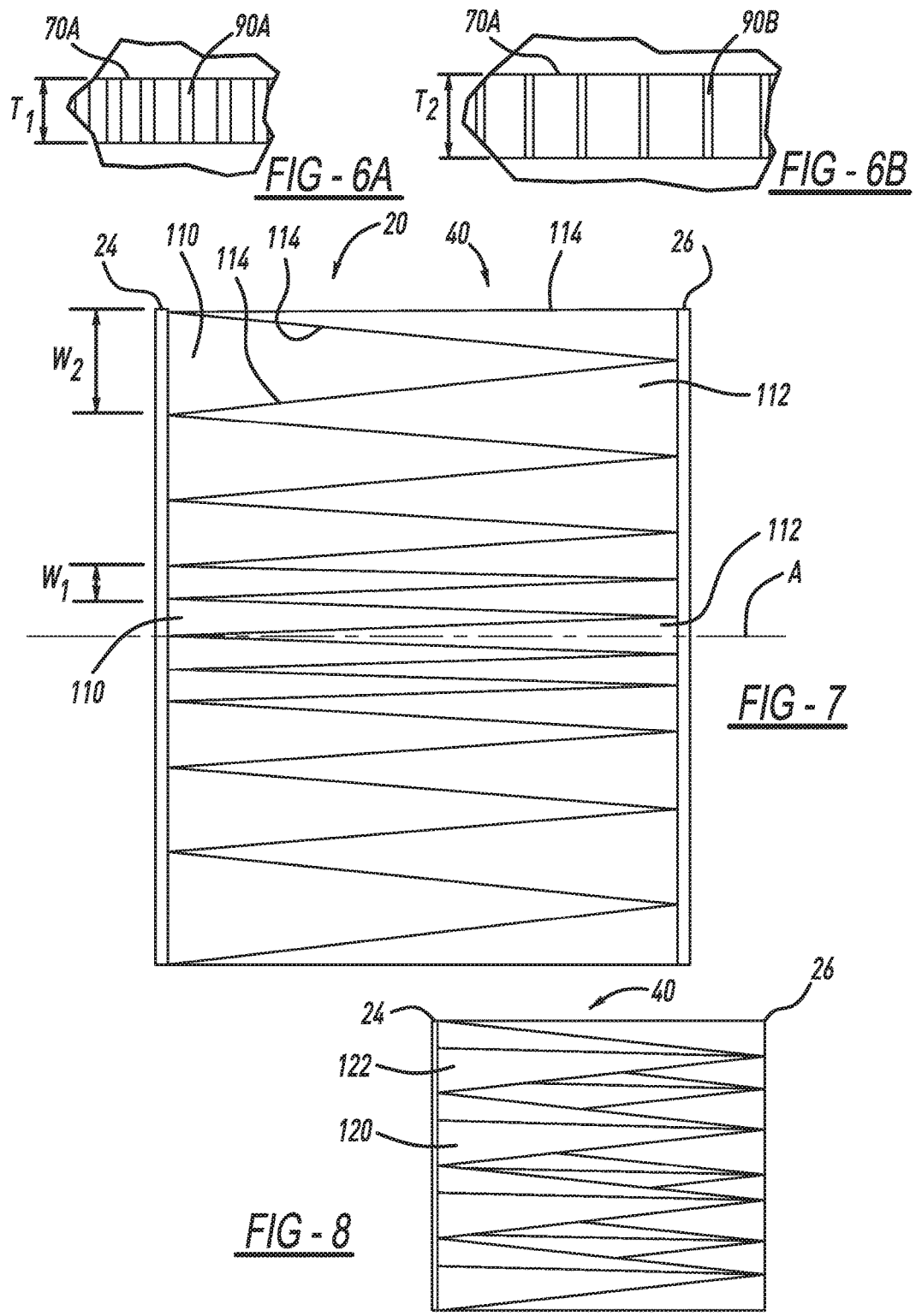

EMISSIONS CONTROL SUBSTRATE

FIELD

The present disclosure relates to an emissions control substrate.

BACKGROUND

This section provides background information related to the present disclosure, which is not necessarily prior art.

Emissions control substrates are often used with engine exhaust systems to treat the exhaust before it is released into the atmosphere. For example, a catalytic converter substrate is often used with automobile exhaust systems to catalyze a redox reaction, thereby converting CO into $CO_2$, and converting $NO_x$ into $N_2$ and $O_2$. A particulate filter substrate is often used to treat exhaust gas from an engine by filtering particulate matter out of the exhaust. While existing emissions control substrates are suitable for their intended use, they are subject to improvement. The present teachings provide for emissions control substrates that address various needs in the art, and provide numerous unexpected and advantageous results.

SUMMARY

This section provides a general summary of the disclosure, and is not a comprehensive disclosure of its full scope or all of its features.

The present teachings provide for an emissions control substrate. The emissions control substrate includes a first end in receipt of exhaust from an engine, and a second end from which exhaust exits the substrate. The second end is opposite to the first end. A plurality of channels are defined by sidewalls. The channels are arranged between the first end and the second end to direct exhaust from the engine through the emissions control substrate. The sidewalls at least one of filter and treat exhaust particulates as the exhaust passes through the sidewalls. The plurality of channels include at least one first channel defined by sidewalls that curve inward along lengths thereof from the first end to the second end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 6A illustrates area 6A of FIG. 5;

FIG. 6B illustrates area 6B of FIG. 5;

FIG. 7 is a cross-sectional view of yet another emissions control substrate according to the present teachings;

FIG. 8 is a cross-sectional view of still another emissions control substrate according to the present teachings;

Corresponding reference numerals indicate corresponding parts throughout the several views of the drawings.

DETAILED DESCRIPTION

Example embodiments will now be described more fully with reference to the accompanying drawings.

Figure 1:
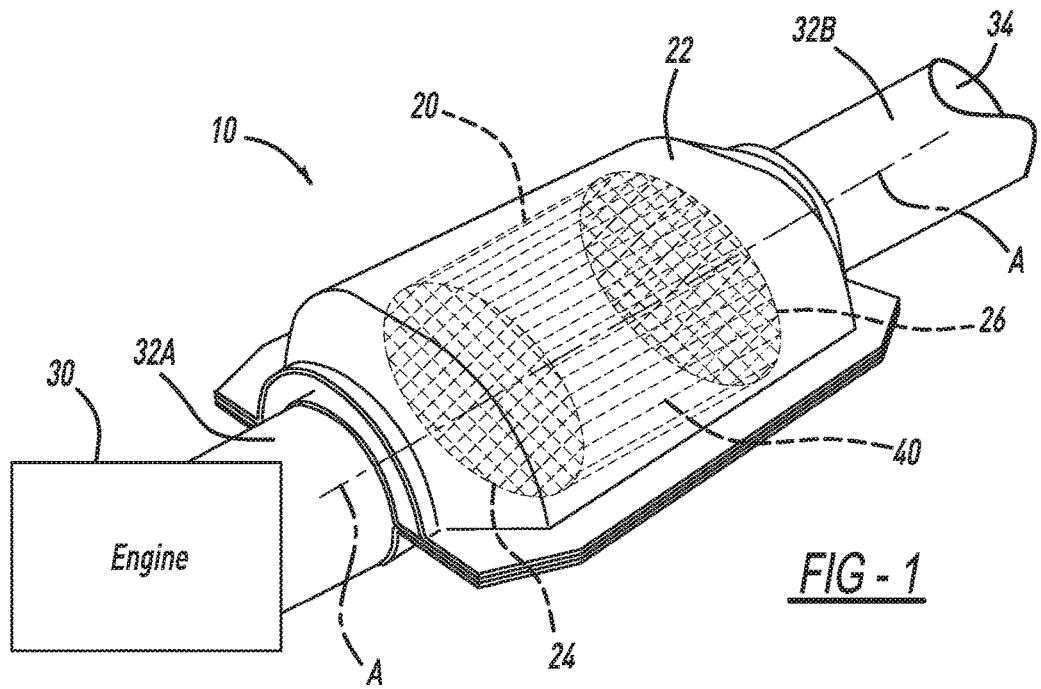
FIG. 1 illustrates an exhaust system including an emissions control substrate according to the present teachings.

With initial reference to FIG. 1, an exhaust system including an emissions control substrate 20 according to the present teachings is generally illustrated at reference numeral 10. The exhaust system 10 can be any suitable vehicle exhaust system, and engine 30 can be any suitable vehicle engine. For example, the exhaust system 10 can be used with passenger vehicles, sport utility vehicles, recreational vehicles, military vehicles, mass transit vehicles, locomotives, watercraft, aircraft, etc. The exhaust system 10 can also be configured for controlling emissions from any other suitable engine, such as any other suitable internal combustion engine, generator, military equipment, mining equipment, building equipment, etc.

The exhaust system 10 includes the emissions control substrate 20 housed within a substrate chamber 22. The substrate 20 is arranged to treat exhaust from the engine 30, which is directed to the substrate 20 through a first exhaust conduit portion 32A. For example, the substrate 20 can be configured as a catalytic converter or a particulate matter filter, such as a diesel particulate filter, gasoline engine particulate filter, or any other suitable particulate filter.

The emissions control substrate 20 generally includes a first end 24 and a second end 26, which is opposite to the first end 24. Exhaust from the engine 30 flows through the first exhaust conduit portion 32A and enters the substrate 20 at the first end 24 thereof. The exhaust flows through the substrate 20 and exits the substrate 20 at the second end 26. From the second end 26, the exhaust flows through a second exhaust conduit portion 32B to an outlet 34 of the exhaust system 10. The outlet 34 can be in the form of, for example, a vehicle tailpipe. The substrate 20 defines a plurality of channels 40, which generally extend between the first end 24 and the second end 26 of the substrate 20. A longitudinal axis A of the substrate 20 extends from the first end 24 to the second end 26 generally through a center of the substrate 20, such as through an axial center of the substrate 20.

Figure 2:
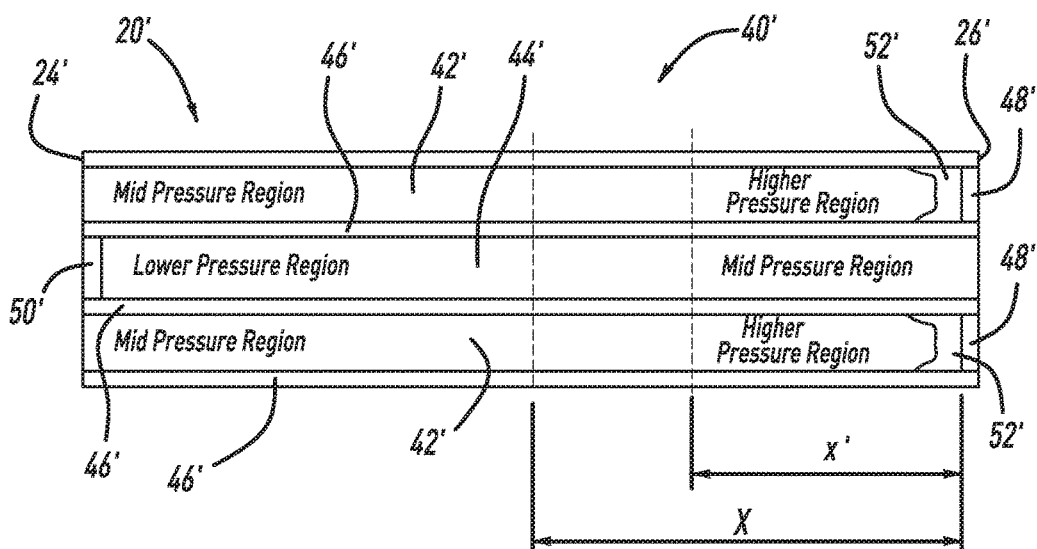
FIG. 2 is a cross-sectional view of channels of a prior art emissions control substrate.

FIG. 2 illustrates prior art channels 40' of a prior art emissions control substrate 20'. The channels 40' include at least two first channels 42', and a second channel 44' therebetween. The channels 42' and 44' extend linearly from the first end 24' to the second end 26' parallel to longitudinal axis A of the prior art substrate 20'. The channels 42' and 44' are defined by sidewalls 46' of the substrate 20'. At the second end 26', the first channels 42' are closed by plugs 48'. At the first end 24' the second channel 44' is closed by a plug 50'. When the substrate 20' is configured as a particulate matter filter, such as a diesel particulate matter filter, exhaust flowing into the first channels 42' will contact the plugs 48', and result in buildup of soot, ash, dust, etc. 52' at the plugs 48' arranged at the second end 26'. This buildup of soot, etc.

52' results in a high pressure buildup at the second end 26', and at a distance X' from the second end 26'.

In this high pressure region X', the increased pressure forces exhaust from the first channels 42' through the sidewalls 46' defining the second channel 44', and into the second channel 44'. As the exhaust passes through the sidewalls 46', the sidewalls 46' filter (and thus trap therein) particulate matter from exhaust passing through the sidewalls 46', or catalyze a redox reaction when the substrate 40' is configured as a catalytic converter substrate. The particulate matter filtered/treated can be any suitable atmospheric pollutant including hydrocarbons or other chemicals, such as soot, ash, dust, fumes, smog, etc., for example. The sidewalls 46' can include any suitable ceramic material, such as cordierite. Thus exhaust flowing into the second channel 44' from the first channels 42' is free of such particulate matter, and exits the substrate from the second channel 44' at the second end 26'.

The area X' of high pressure is considered the working area of the prior art substrate 20' because it is generally only in this area that exhaust from the first channels 42' flows into the second channel 44' through the sidewalls 46' and is filtered/treated by the sidewalls 46'. In such prior art substrates 20', portions of the sidewalls 46' between the first end 24' and the working area X' of high pressure are not effective to filter particulates from exhaust gas, or catalyze a redox reaction, because the pressure between the first end 24' and the high pressure working area X' is not high enough to force exhaust gas through the sidewalls 46' upstream (i.e., between the first end 24' and the high pressure working area X') of the high pressure working area. As explained herein, the present teachings advantageously increase the high pressure working area X' so that it extends further towards the first end 24', such as to high pressure working area X.

When the substrate 10 is configured as a particulate filter substrate, high pressure working area X advantageously provides for increased, and more efficient, filtering of particulates from the exhaust gas because a greater surface area of sidewalls 46 filters the exhaust gas. When the substrate 10 is configured as a catalytic converter substrate, high pressure working area X advantageously forces an increased volume of exhaust across a greater area of sidewalls 46, thereby increasing the effectiveness of the catalytic converter redox reaction.

Figure 3:
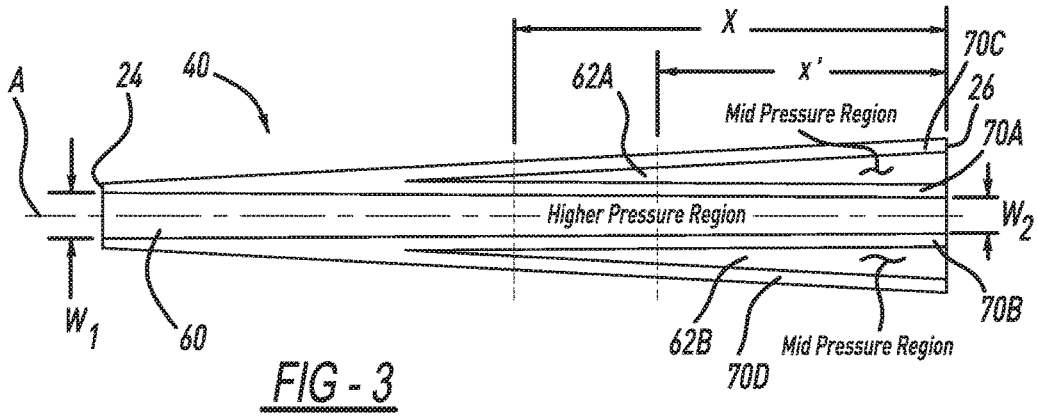
FIG. 3 is a cross-sectional view of channels of an exemplary emissions control substrate according to the present teachings.

FIG. 3 illustrates exemplary channels 40 of substrate 20 according to the present teachings. The channels 40 include a first channel 60, which is between second channels 62A and 62B. Although FIG. 3 illustrates only a single first channel 60, the substrate 20 can include channels 40 having a plurality of first channels 60, each of which extends between or through one or more second channels 62A/62B. The first and second channels 60, 62A, 62B can have any suitable shape in cross section, such as circular, square, polygonal, etc.

In the example of FIG. 3, the first channel 60 extends from the first end 24 to the second end 26 of the substrate 20. The first channel 60 may alternatively be at any other suitable position within the substrate 20. The first channel 60 will extend parallel to the longitudinal axis A in most applications. The first channel 60 is defined by sidewalls 70A and 70B, which can be one continuous sidewall, such as a circular sidewall, or can have multiple surfaces.

The first channel 60 has a cross sectional width $W_1$ at the first end 24, and a cross sectional width $W_2$ at the second end 26. The width $W_1$ at the first end 24 is greater than the width $W_2$ at the second end 26. Thus the first channel 60 generally tapers inward from the first end 24 to the second end 26 along a longitudinal axis of the first channel 60, such as longitudinal axis A.

The second channels 62A and 62B can be separate channels, or a continuous channel surrounding the first channel 60. The second channels 62A and 62B generally expand or fan outward from the first channel 60 from a point downstream of the first end 24 relative to the flow of exhaust gas through the first channel 60 to the second end 26. As exhaust flows through the first channel 60 from the first end 24, the tapered sidewalls 70A and 70B of the first channel 60 will pressurize the exhaust gas at high pressure working area X, and force a portion of the exhaust gas through the sidewalls 70A and 70B into the second channels 62A and 62B. As the exhaust gas passes through the sidewalls 70A and 70B, the exhaust gas is filtered of particulate matter (when the substrate 20 is configured as a particulate matter filter) or a redox reaction is catalyzed (when the substrate 20 is configured as a catalytic converter substrate).

The high pressure area X according to the present teachings is greater than the high pressure area X' of the prior art, which advantageously increases the working area of the channels 40 of FIG. 3. As a result, the configuration of FIG. 3 is able to more efficiently filter particulate matter from the exhaust, or catalyze a redox reaction, and eliminates any potential buildup of soot, etc. at the second end 26 that may potentially result from the presence of plugs at the second end 26, as is the case in the prior art arrangement of FIG. 2.

Figure 4:
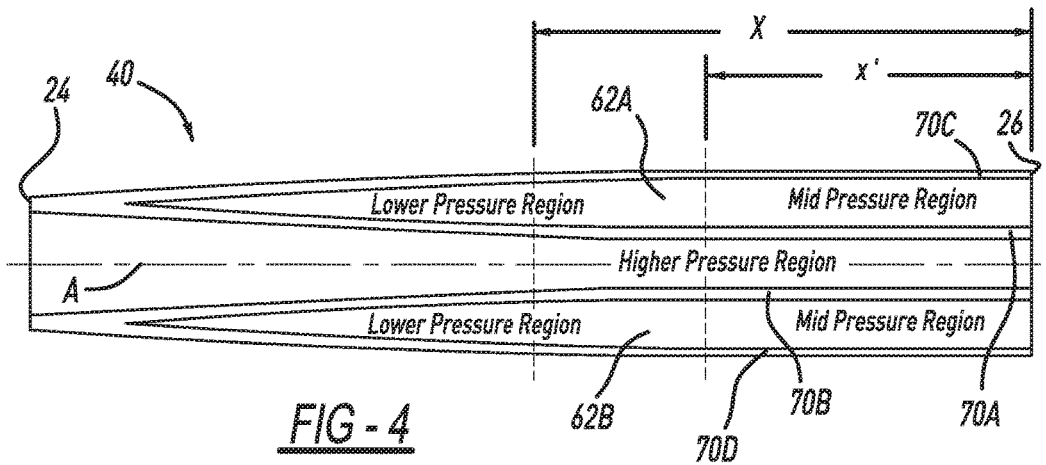
FIG. 4 is a cross-sectional view of channels of another emissions control substrate in accordance with the present teachings.

FIG. 3 illustrates the second channels 62A and 62B as being defined by generally linear sidewalls 70A, 70B, 70C, and 70D. However and as illustrated in FIG. 4, the sidewalls 70A, 70B, 70C, and 70D can be curved along the lengths thereof. For example, the inner sidewalls 70A and 70B can gradually curve inward along the length of the first channel 60 from the first end 24 to the second end 26. The sidewalls 70A and 70B generally curve outward with respect to the second channels 62A and 62B. The second channels 62A and 62B are further defined by sidewalls 70C and 70D, which gradually curve outward along the lengths thereof from the first end 24 to the second end 26. As compared to the configuration of FIG. 3, the second channels 62A and 62B start closer to the first end 24. The high pressure working area X of the arrangement of FIG. 4 is greater than the prior art high pressure working area X'. As a result, the configuration of FIG. 4 in accordance with the present teachings is able to filter exhaust particulates, and catalyze a redox reaction, with greater efficiency.

Figure 5:
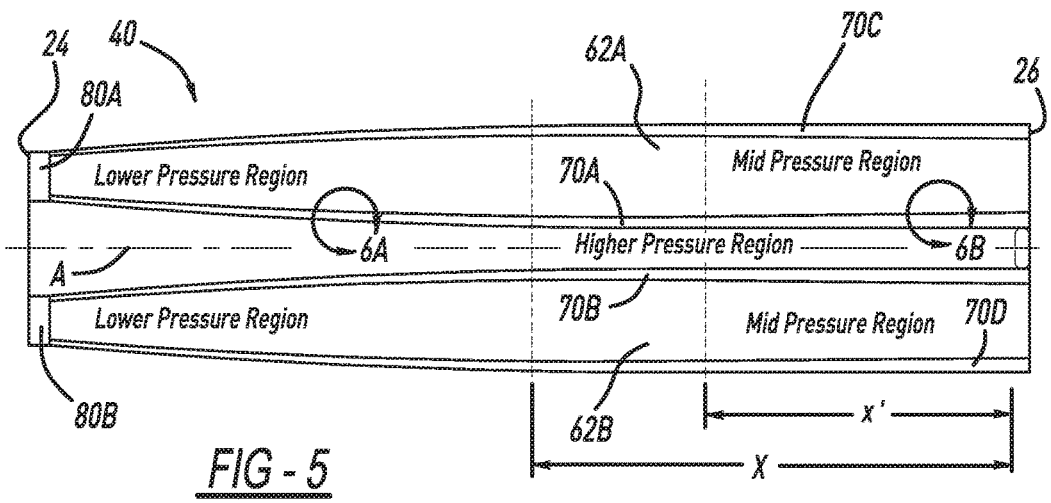
FIG. 5 is a cross-sectional view of another emissions control substrate according to the present teachings.

With reference to FIG. 5, the second channels 62A and 62B can extend to the first end 24, where the second channels 62A and 62B are closed by plugs 80A and 80B. When the second channels 62A and 62B are separate channels, the plugs 80A and 80B will be separate plus. However, when the second channels 62A and 62B are configured as a single continuous channel surrounding the first channel 60, the plugs 80A and 80B can be configured as a single continuous plug, such as a circular plug.

With reference to FIGS. 6A and 6B, the sidewalls defining the channels 40, such as sidewalls 70A (illustrated in FIGS. 6A and 6B) and 70B, each define a plurality of pores 90A and 90B extending therethrough. The pores 90A and 90B provide fluid communication between the first channel 60 and the second channels 62A and 62B. Thus exhaust flowing through the first channel 60 passes into the second channels 62A and 62B through the pores 90A and 90B.

Any suitable number of pores 90A and 90B can be defined by the sidewalls 70A and 70B, the pores 90A and 90B can have any suitable diameter, and can be spaced apart at any suitable distance. For example, pores 90A proximate to the first end 24 can be arranged closer together than, and can have a larger diameter than, pores 90B proximate to the second end 26. Furthermore, a greater number of pores 90A can be arranged proximate to the first end 24 as compared to the number of pores 90B arranged proximate to the second end 26. The pores 90A allow exhaust to flow from the first channel 60 to the second channels 62A and 62B more freely proximate to the first end 24 as compared to the pores 90B proximate to the second end 26. The sidewalls 70A and 70B can also be made thinner proximate to the first end 24 (FIG. 6A) as compared to the second end 26 (FIG. 6B), such that thickness $T_1$ is less than thickness $T_2$.

The arrangement of the pores 90A described above and the thinner sidewalls 70A/70B proximate to the first end 24 advantageously facilitate flow of exhaust from the first channel 60 to the second channel(s) 62A and 62B, which can advantageously compensate for the smaller pressure differential at the first end 24 between the first channel 60 and the second channel(s) 62A/62B. Arranging the pores 90B as described above proximate to the second end 26 advantageously increases filtration of smaller exhaust particles proximate to the second end 26 where the pressure differential between the first channel 60 and the second channel(s) 62A and 62B is relatively higher than at the first end 24. Any of the channels 40 described herein can include pores configured as the pores 90A proximate to the first end 24, and the pores 90B proximate to the second end 26, as well as have sidewalls 70A/70B that are thinner proximate to the first end 24 as compared to proximate to the second end 26.

When the substrate 20 is configured as a substrate with a catalyst, catalyst lightoff time can be reduced by decreasing the bulk density of the sidewalls 70A/70B at the first end 24 by making the sidewalls 70A/70B thinner as compared to at the second end 26. Providing the sidewalls 70A/70B with an increased thickness at the second end 26 as compared to the first end 24 will advantageously increase the strength of the substrate 20 at the second end 26. Reducing the thickness of the sidewalls 70A/70B at the first end 24 can increase the lightoff time because the thinner walls and the increased porosity provided by the pores 90A allows thermal energy to be more readily transferred from the exhaust to the precious metal of the substrate, which facilitates the ability of the precious metal to catalyze the reaction.

In the example of FIG. 7, the channels 40 include channels 110 with openings at the first end 24, and channels 112 with openings at the second end 26. The channels 110 taper inward from the first end 24 to the second end 26. The channels 112 taper inward from the second end 26 to the first end 24. Exhaust entering the channels 110 at the first end 24 is treated as the exhaust passes through sidewalls 114 into the channels 112. The treated exhaust exits the substrate 20 at the second end 26. In the example of FIG. 7, the channels 110 are formed to be closed at the second end 26. At the second end 26 the channels 110 can have any suitable shape, such as a rounded shape or a more sharply tapered shape. Forming the channels 110 with a closed end at second end 26 advantageously eliminates the need for a separate plug, which increases the speed of manufacturing and reduces manufacturing costs. Providing a rounded channel end at the second end 26 also advantageously reduces hard corners or points, which can reduce the potential for cracking and thus increase channel durability. Also, a rounded channel end at the second end 26 provides more surface area for ash to accumulate so that the pressure drop is reduced.

With continued reference to FIG. 7, the channels 40 can have different opening diameters to accommodate different exhaust pressures. Specifically, the channels 40 can have larger openings at portions of the substrate 20 that experience high pressure as compared to portions of the substrate 20 that experience low pressure. For example and with reference to FIG. 7, the substrate 20 experiences the greatest pressure at generally the center thereof, such as proximate to the longitudinal axis A, and is subject to relatively less pressure distal to the longitudinal axis A. Thus proximate to the longitudinal axis A, first channels 110 and second channels 112 can define openings at the first and second ends 24 and 26 respectively having widths $W_1$, which are comparatively smaller than widths $W_2$ of openings of surrounding channels that experience relatively lower pressure. Providing larger openings $W_2$ of the channels 110 and 112 at areas of relatively lower pressure advantageously draws exhaust at the first end 24 to the first channels 110 with the larger openings $W_2$, thus drawing exhaust away from the higher pressure regions of the substrate 20 where the first channels 110 have smaller openings $W_1$ in order to even the load on the substrate 20 across the first end 24 and through the substrate 20, thereby making the substrate 20 more efficient to filter exhaust.

The channels 40 of FIG. 7 are illustrated as having generally planar sidewalls 114. However, the sidewalls of the channels 110 and 112 can have any other suitable shape or configuration. For example, the sidewalls 114 can be circular or multisided, such as illustrated in FIG. 8. FIG. 8 illustrates the channels 40 as including pyramid-shaped channels 120, which are defined by planar sidewalls 122 arranged generally in the form of a pyramid.

Figure 9:
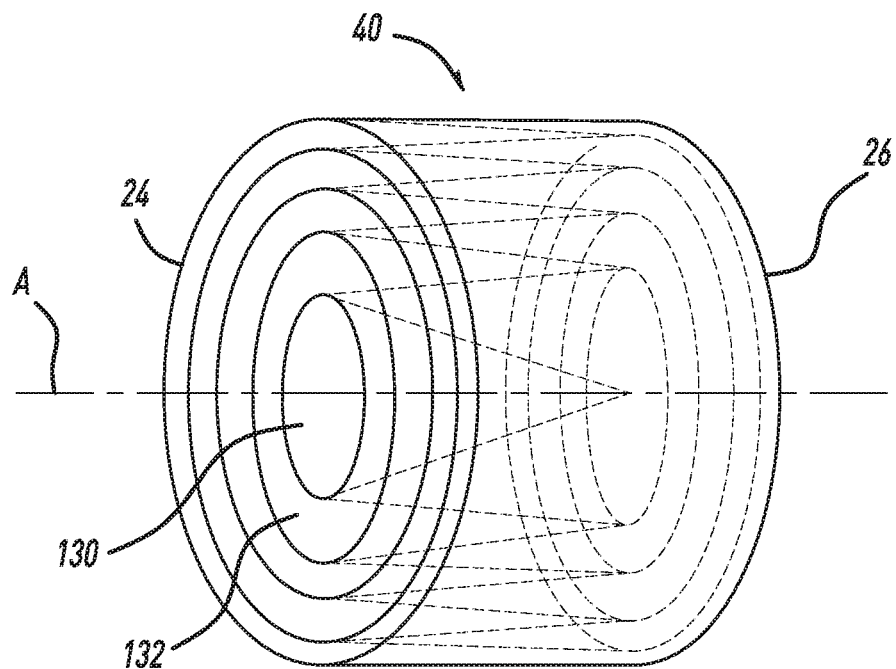
FIG. 9 is a cross-sectional view of an additional emissions control substrate according to the present teachings.

With reference to FIG. 9, the plurality of channels 40 can include a cone-shaped center channel 130 through which the longitudinal axis A extends. The cone-shaped center channel 130 is surrounded by a series of surrounding channels 132. The surrounding channels 132 can all start at the first end 24, or be staggered with respect to the first end. The surrounding channels 132 can have various different lengths, or uniform lengths. Exhaust entering the channels 130/132 on the first side 24 thereof is treated as the exhaust passes through the sidewalls of the channels 130/132 in order to treat the exhaust prior to the exhaust exiting the substrate 20 at the second end 26.

Figure 10:
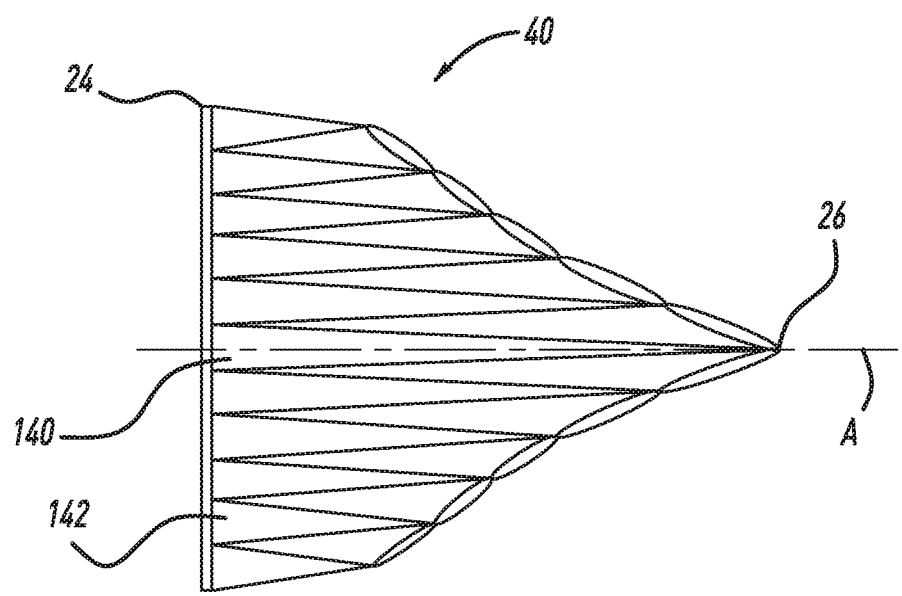
FIG. 10 is a cross-sectional view of a further emissions control substrate according to the present teachings.

FIG. 10 illustrates the plurality of channels 40 as having different lengths, with a center channel 140 being the longest. Channels 142 on opposite sides of the center channel 140 are progressively shorter in order to equalize exhaust pressure across the plurality of channels 40. The center channel 140 is arranged along the longitudinal axis A and is the longest channel in order to equalize the exhaust pressure in applications where pressure is highest along the longitudinal axis A. In applications where pressure is greatest at areas other than the longitudinal axis A, the longest channel can be arranged in the high pressure area spaced apart from longitudinal axis A, and surrounded by progressively shorter channels, in order to equalize exhaust pressure across the plurality of channels 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An emissions control substrate comprising:
  a first end in receipt of exhaust from an engine, and a second end from which exhaust exits the substrate, the second end is opposite to the first end and a longitudinal axis of the substrate extends through the first end and the second end; and
  a plurality of channels defined by sidewalls and extending parallel to the longitudinal axis, the channels arranged between the first end and the second end to direct exhaust from the engine through the emissions control substrate, the sidewalls at least one of filter and treat exhaust particulates as the exhaust passes through the sidewalls;
  wherein the plurality of channels include at least one first channel defined by one or more sidewalls that curve inward along lengths thereof from the first end to the second end;
  wherein each of the plurality of channels proximate to a high pressure region of the emissions control substrate have a smaller area and smaller opening at the first end as compared to each of the plurality of channels distal to the high pressure region to more evenly distribute exhaust entering the first end and even a load on the emissions control substrate; and
  wherein the high pressure region is at a longitudinal axis extending through an axial center of the emissions control substrate.

2. The emissions control substrate of claim 1, wherein the one or more sidewalls are thinner proximate to the first end as compared to the second end.

3. The emissions control substrate of claim 1, wherein the plurality of channels further include second channels adjacent the first channel, each one of the second channels defined by one or more sidewalls that taper outward as the second channels extend away from the first end and towards the second end.

4. The emissions control substrate of claim 3, wherein:
  each of the one or more sidewalls defining the first channel define pores extending through the one or more sidewalls to place the first channel in fluid communication with the second channels so as to allow exhaust to flow from the first channel to the second channels through the pores;
  the sidewalls at least one of treat and filter particulates from the exhaust as the exhaust flows through the pores; and
  pores proximate to the first end have a larger diameter as compared to pores proximate to the second end.

5. The emissions control substrate of claim 3, wherein:
  each of the one or more sidewalls defining the first channel define pores extending through the one or more sidewalls to place the first channel in fluid communication with the second channels so as to allow exhaust to flow from the first channel to the second channels through the pores;
  the sidewalls at least one of treat and filter particulates from the exhaust as the exhaust flows through the pores; and
  pores proximate to the first end are arranged closer together as compared to pores proximate to the second end.

6. The emissions control substrate of claim 3, wherein:
- each of the one or more sidewalls defining the first channel define pores extending through the sidewalls to place the first channel in fluid communication with the second channels so as to allow exhaust to flow from the first channel to the second channels through the pores;
- the sidewalls at least one of treat and filter particulates from the exhaust as the exhaust flows through the pores; and
- the sidewalls have a first pore density proximate to the first end that is greater than a second pore density proximate to the second end.

7. The emissions control substrate of claim 3, wherein each one of the first channel and the second channels are open at the second end.

8. The emissions control substrate of claim 1, wherein the second channels begin at a point spaced apart from the first end.

9. The emissions control substrate of claim 1, wherein the second channels are plugged at the first end.

10. The emissions control substrate of claim 1, wherein the sidewalls of the second channels curve outward away from the longitudinal axis as the second channels extend away from the first end and towards the second end.

11. The emissions control substrate of claim 2, wherein:
- the first channel is open at the first end and closed at the second end; and
- the second channel is closed at the first end and open at the second end.

12. The emissions control substrate of claim 1, wherein the plurality of channels are longer at a high pressure region than at a low pressure region of the emissions control substrate.

13. The emissions control substrate of claim 1, wherein the one or more sidewalls of the plurality of channels are circular.

14. The emissions control substrate of claim 1, wherein the one or more sidewalls of the plurality of channels are planar.

15. The emissions control substrate of claim 1, wherein some of the plurality of channels are closed at the second end with rounded plugs.

16. An emissions control substrate comprising:
- a first end in receipt of exhaust from an engine, and a second end from which exhaust exits the substrate, the second end is opposite to the first end and a longitudinal axis of the substrate extends through the first end and the second end; and
- a plurality of channels defined by one or more sidewalls and extending parallel to the longitudinal axis, the channels arranged between the first end and the second end to direct exhaust from the engine through the emissions control substrate, the one or more sidewalls at least one of filter and treat exhaust particulates as the exhaust passes through the sidewalls;
- wherein the one or more sidewalls have a first thickness proximate to the first end and a second thickness proximate to the second end, the first thickness is thinner than the second thickness;
- wherein each of the plurality of channels proximate to a high pressure region of the emissions control substrate have a smaller area and smaller opening at the first end as compared to each of the plurality of channels distal to the high pressure region to more evenly distribute exhaust entering the first end and even a load on the emissions control substrate; and
- wherein the high pressure region is at a longitudinal axis extending through an axial center of the emissions control substrate.

17. An emissions control substrate comprising:
- a first end in receipt of exhaust from an engine, and a second end from which exhaust exits the substrate, the second end is opposite to the first end and a longitudinal axis of the substrate extends through the first end and the second end; and
- a plurality of channels defined by one or more sidewalls and extending parallel to the longitudinal axis, the channels arranged between the first end and the second end to direct exhaust from the engine through the emissions control substrate, the one or more sidewalls at least one of filter and treat exhaust particulates as the exhaust passes through the sidewalls; and
- a plurality of pores defined by the one or more sidewalls that provide fluid communication between a first channel and neighboring second channels of the plurality of channels so exhaust can flow from the first channel to the neighboring channels through the plurality of pores;
- wherein the one or more sidewalls include a greater density of the plurality of pores proximate to the first end as compared to the second end;
- wherein each of the plurality of channels proximate to a high pressure region of the emissions control substrate have a smaller area and smaller opening at the first end as compared to each of the plurality of channels distal to the high pressure region to more evenly distribute exhaust entering the first end and even a load on the emissions control substrate; and
- wherein the high pressure region is at a longitudinal axis extending through an axial center of the emissions control substrate.

18. The emissions control substrate of claim 17, wherein the plurality of pores proximate to the first end have a larger diameter than the plurality of pores proximate to the second end.

* * * * *

UNITED STATES PATENT AND TRADEMARK OFFICE
CERTIFICATE OF CORRECTION

PATENT NO. : 10,494,970 B2  
APPLICATION NO. : 15/641834  
DATED : December 3, 2019  
INVENTOR(S) : Edward Szczepanski et al.

Page 1 of 1

It is certified that error appears in the above-identified patent and that said Letters Patent is hereby corrected as shown below:

On the Title Page

Item [72] Delete "Point" and insert --Pointe-- therefor

Signed and Sealed this
Tenth Day of March, 2020

Andrei Iancu
*Director of the United States Patent and Trademark Office*